Jan. 10, 1928.
L. W. WATERS
1,655,670
ELECTRIC WINDSHIELD WIPER
Filed May 2, 1927
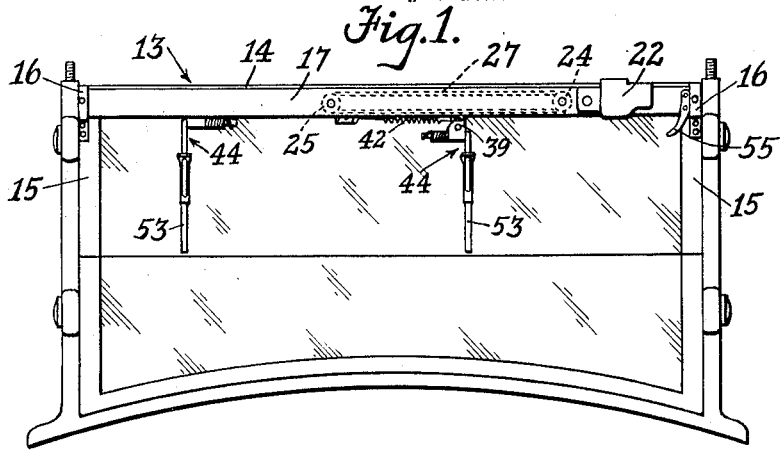
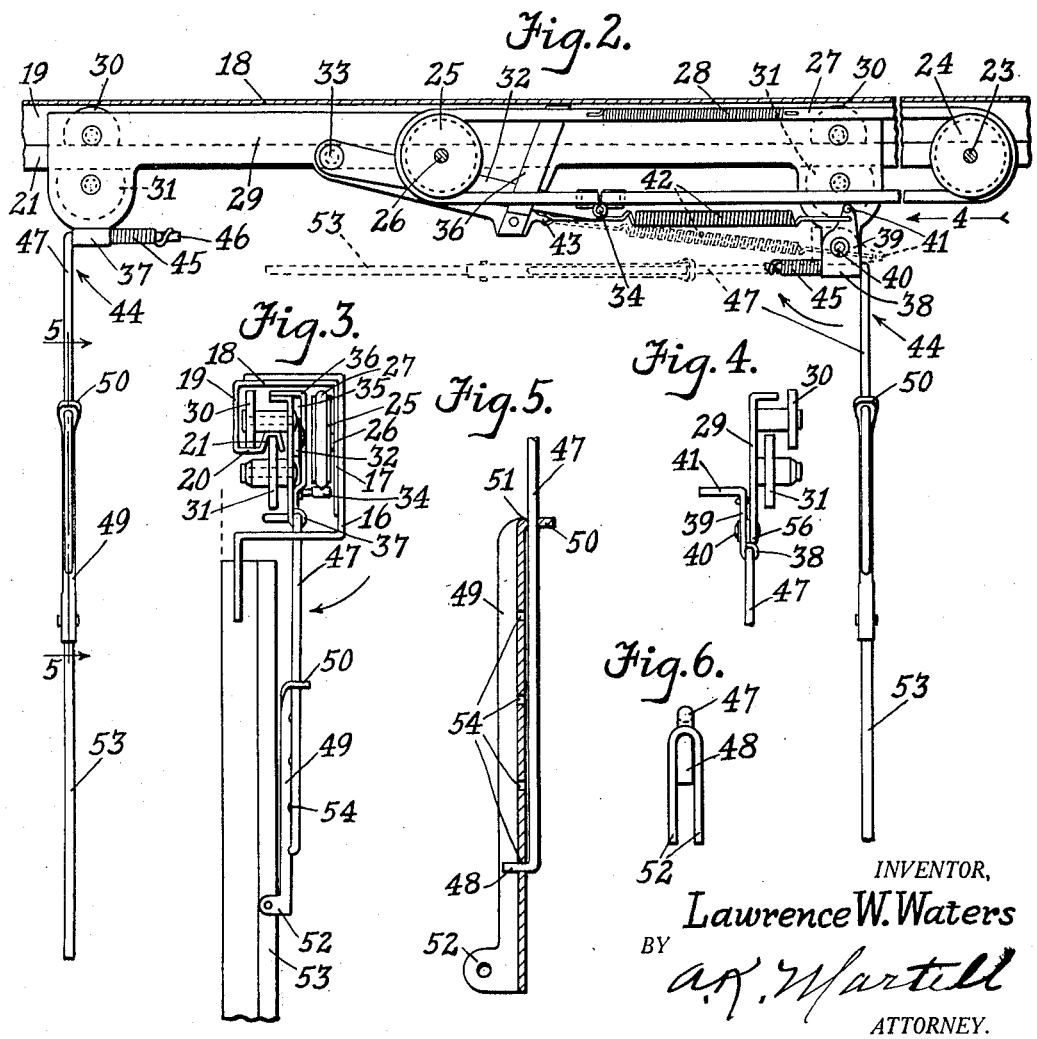
INVENTOR,
Lawrence W. Waters
BY
ATTORNEY.

Patented Jan. 10, 1928.

1,655,670

UNITED STATES PATENT OFFICE.

LAWRENCE W. WATERS, OF LOS ANGELES, CALIFORNIA.

ELECTRIC WINDSHIELD WIPER.

Application filed May 2, 1927. Serial No. 188,229.

My invention relates to automobile accessories and more particularly to a windshield wiper which is an improvement on the one shown in my former application filed Feb. 19, 1927, under Serial No. 169,525.

The primary object of my invention is to provide an electrically operated windshield wiper which will sweep over the front side of the upper glass in the windshield with a relatively short path of travel and a consequent increased frequency of action.

A further object is to provide a windshield wiper having two wiping members attached to adjustable arms, one of which may be folded out of the way when not operating; also means for automatically restoring the arm so folded to its operative position.

Other objects and advantages will appear hereinafter and while I show herewith and will describe a preferred form of construction, I desire it to be understood that I do not confine my invention to such preferred form but that various changes and adaptations may be made therein without departing from the spirit of my invention as hereinafter claimed.

Referring to the drawings which accompany this specification and form a part thereof.

Fig. 1 is a front view of a windshield equipped with my improved wiper.

Fig. 2 is an enlarged fragmentary front view of the windshield wiper shown in Fig. 1, with the front plate thereof broken away.

Fig. 3 is a right-end view of my windshield wiper enlarged to correspond with Fig. 2.

Fig. 4 is a left-end view of the carriage portion of my windshield as seen looking in the direction indicated by arrow 4 in Fig. 2.

Fig. 5 is an enlarged fragmentary sectional view of one of the arms which form a part of my windshield wiper, taken on line 5—5 of Fig. 2.

Fig. 6 is a lower-end view of one of the wiper arms.

The present wiper is similar to the one shown in the former application referred to above in that it has a similar housing 13 attached to the top-rail 14 and stiles 15 of the windshield frame by brackets 16, a front plate or wall 17 and a roof plate 18 forming an elongated hood within which the operating parts of the wiper are supported. Roof plate 18, in this case, however, is made plane instead of being grooved and has a right-angled flange 19 extending downwardly from its rear edge which flange is bent longitudinally first to form a horizontal runway 20 and then on inverted channel 21 in parallel spaced relation to roof plate 18.

A small electric motor 22 is mounted on front plate 17 of the housing adjacent one end thereof and a stub shaft 23, journaled in front plate 17, is geared to the motor so as to be driven thereby. A drive pulley 24 is fixed on the inner end of stub shaft 23 and an idle pulley 25, similar to drive pulley 24 is mounted on a pivot pin 26 which is fixed in front plate 17, at approximately the middle of the housing, so as to extend within the housing parallel to stub shaft 23. Pulleys 24 and 25 are grooved to receive a round belt 27 which travels around them and is resiliently held in their grooves by a helical spring 28 having the same diameter as the belt, said spring being fixed in the belt so as to form a section thereof, as is clearly shown in Fig. 2.

A relatively long carriage-plate 29, approximately half the length of housing 13, with a smaller roller 30 and a larger roller 31 mounted on the rear side thereof adjacent each end, is placed within the housing so that smaller rollers 30 travel on runway 20 and larger rollers 31 run in channel 21, as shown in Fig. 3. A connecting arm 32 having one end pivotally attached to the carriage plate as at 33 and the other pivotally attached to the belt connector as at 34 swings in a slot 35 formed by a guide-bar 36 fastened to the front side of the carriage plate, from side to side of the pulleys as belt 27 travels therearound, and causes said carriage plate 29 to reciprocate from end to end of housing 13.

A bearing sleeve 37 is formed on the lower edge of carriage plate 29 adjacent its right end and a similar sleeve 38 is formed on the lower end of a turn-plate 39 which is pivotally attached to the carriage plate adjacent its left end, as at 40. The upper end of turn-plate 39 is equipped with a right-angled trigger 41 and the plate as a whole is held in either of two positions by a helical spring 42 attached to the upper end thereof and to the lower edge of carriage plate 29, as at 43.

Right-angled arms 44 controlled by springs 45 are mounted in bearing sleeves 37 and 38, the shorter end 46 thereof projecting toward the center of carriage plate 29 and the longer ends 47 extending downwardly in parallel relation to each other, said longer ends being bent to form right angled terminal pins 48. An extension-piece 49 made of thin plate metal which is bent to form a channel is provided to vary the length of the longer ends or shanks 47 of arms 44. The upper end of the extension piece is formed into a right-angled lug 50 which is perforated, as at 51 to permit the insertion of shank 47 and the lower end thereof is formed into two parallel perforated lugs 52 adapted to be pivotally connected to a squeegee 53 or other wiping device. A series of spaced perforations 54 are made through the web of extension piece 49, into any one of which terminal pin 48 may be inserted. A trip-finger 55 is fixed on the left end of housing 13 in such a position that it will engage trigger 41 near the left end of its travel when turn-plate 39 is swung into its folding position.

The wiper, thus constructed and mounted on the windshield as illustrated in Fig. 1, and the motor having been connected with a switch in an electric circuit as suggested in the original application its operation is started or stopped by simply closing or opening the switch. The operation is stopped when carriage plate 29 is in its extreme right-side position with right arm 44 lying just within the windshield frame and left arm 44 at the middle of the windshield. The latter arm and turn-plate 39 may be turned on pivot 40 into the folded position indicated by dotted lines in Fig. 2, where it is held by spring 42 pulling on plate 39 in a line running below pivot 40. When operation is started again left arm 44 continues in its folded position until finger 55 engages trigger 41 and turns plate 39 sufficiently to bring the line of action of spring 42 above pivot 40, whereupon the spring acts to swing left arm 44 into its operative position. A corner 56 of that part of carriage plate 29 to which turn-plate 39 is pivoted engages sleeve 38 of the latter to hold it in that position. The length of the wiper arms may be adjusted for different sizes of windshields by swinging them away from the glass far enough to withdraw pin 48 from the hole 54 in which it is inserted, shifting extension piece 49 on shank 47 of arm 44 and reinserting pin 48 in another hole.

It will be seen that the action of my improved windshield wiper is similar to the original one but that the use of two wiper arms as shown instead of one, shortens the necessary length of travel thereof so that a more rapid and efficient operation is acquired.

Having thus illustrated and described my invention, I claim:

In a windshield wiper having a carriage equipped with two wiper arms, as described, a turn-plate pivotally attached to one end of the carriage; a bearing-sleeve on the lower end of said turn-plate, in which one of the wiper arms is pivoted; a trigger on the upper end of said turn-plate; a spring attached to said carriage and to said turn-plate whereby the turn-plate is actuated to hold the wiper arm in an operative position or in a folded position, and a finger fixed in the path of said trigger whereby it is tripped so as to cause said turn-plate automatically to swing the wiper-arm from a folded to an operative position by the action of said spring.

LAWRENCE W. WATERS.